(No Model.)
E. H. JOHNSON.
ELECTRICAL APPARATUS FOR HEATING AND COOLING BUILDINGS.
No. 360,223. Patented Mar. 29, 1887.
2 Sheets—Sheet 1.
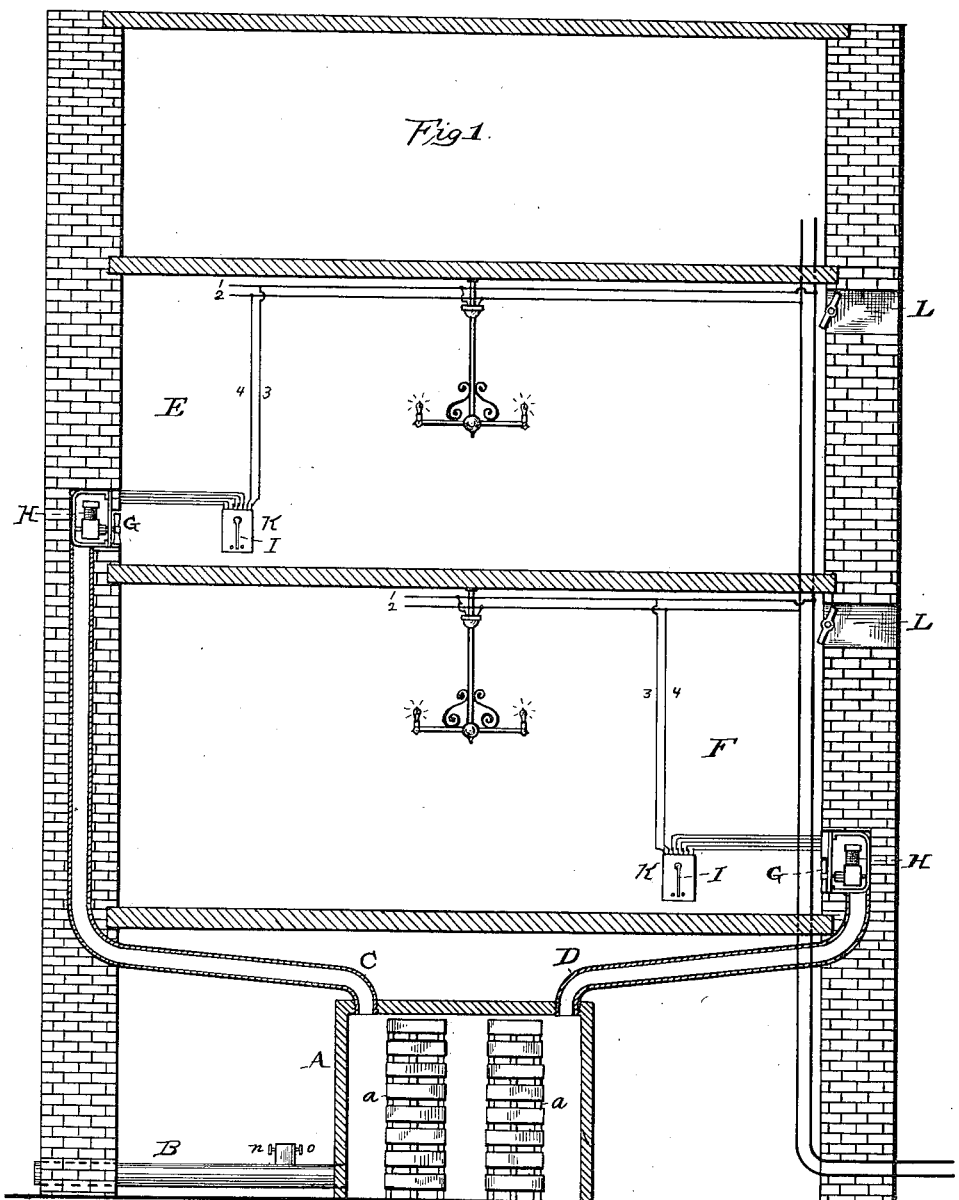
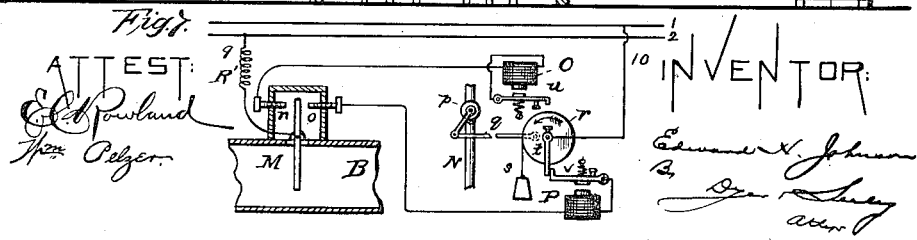

(No Model.) 2 Sheets—Sheet 2.
E. H. JOHNSON.
ELECTRICAL APPARATUS FOR HEATING AND COOLING BUILDINGS.
No. 360,223. Patented Mar. 29, 1887.
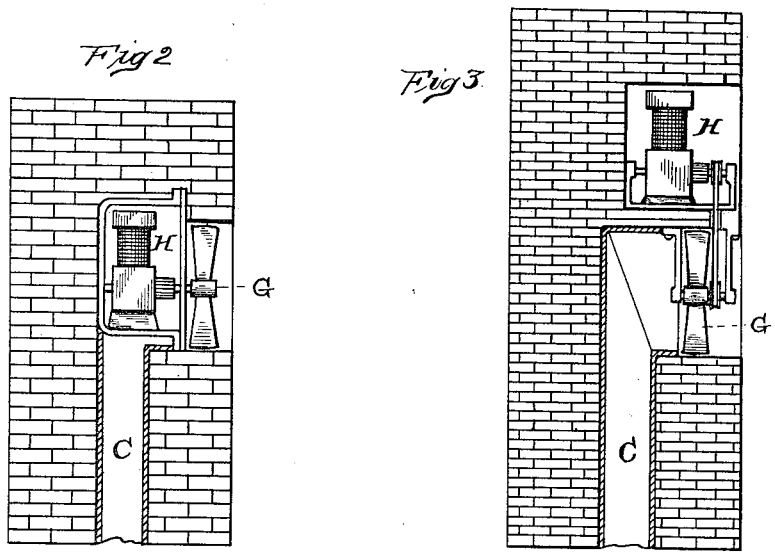
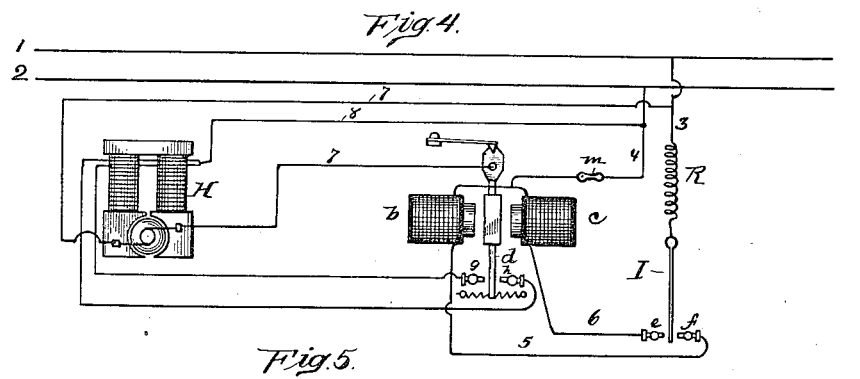
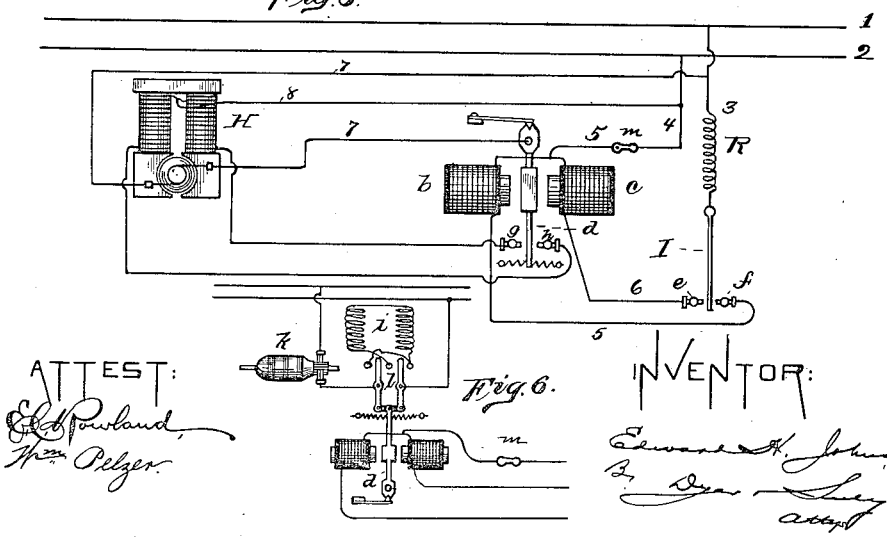
ATTEST:
E. L. Rowland
Wm. Pelzer
INVENTOR:
Edward H. Johnson
By Dyer Seely
Atty

United States Patent Office.

EDWARD H. JOHNSON, OF NEW YORK, N. Y.

ELECTRICAL APPARATUS FOR HEATING AND COOLING BUILDINGS.

SPECIFICATION forming part of Letters Patent No. 360,223, dated March 29, 1887.

Application filed October 8, 1886. Serial No. 215,651. (No model.)

*To all whom it may concern:*

Be it known that I, EDWARD H. JOHNSON, of New York city, in the county and State of New York, have invented a certain new and useful Improvement in Apparatus for Heating and Cooling Buildings, of which the following is a specification.

The object I have in view is to produce a simple, efficient, and economical apparatus for automatically maintaining the desired temperature in the rooms of a building. The apparatus is designed to be controlled and operated electrically. It responds independently to changes in temperature in the separate rooms, floors, or other divisions of a building, and it produces a complete circulation of the heated or cooled air from one part of the building to another, so that an excess of heat or cold in one part will be utilized in other parts of the building where the opposite condition exists.

It is also designed to be economical in the use of power, to prevent waste when there is an excess of heat or cold.

In carrying out the invention I use the ordinary piping extending from the several rooms of a building to a heating or cooling chamber in the cellar, which chamber is in turn connected by a pipe with the atmosphere outside of the building for supplying fresh air to the heating or cooling chamber, from whence it is delivered to the rooms of the building. At the ends of the air-pipes where they open into the rooms are located revolving fans or blowers capable of movement in opposite directions, so that air may be caused to circulate from the pipes into the rooms or from the rooms into the pipes. Each of these fans is revolved by an electric motor, and the motor is controlled by a thermostat located in the same room.

The rooms may have ventilators connecting with the external atmosphere, or the openings such as exist around windows and doors may be depended upon to supply external air to a room when its fan is drawing air from the room and forcing it down the air-pipes. The thermostat located in the room is adjusted to maintain the temperature within certain limits. Within these limits the motor is at rest; but when either limit is reached the thermostat closes a circuit to intermediate electric apparatus, which closes the motor-circuit and causes the motor to revolve. When the thermostat assumes a central position again, the motor-circuit is broken and the motor stopped. The intermediate electric apparatus reverses the motor, as well as opens and closes its circuit, so that the deflection of the thermostat in opposite directions produces opposite movements of the motor and the fan driven by it. If the building is lighted by electricity, the electric current for operating the motors and their controlling devices may be taken from the electric-lighting circuit at a point beyond the electric-light switches, if any are used, so that the current will be supplied at all times. The air drawn from a room and forced into the air-pipe is returned to the heating or cooling chamber in the cellar, and after being further heated or cooled passes from thence into pipes leading to other rooms of the house, so that the heat or cold already stored up in the air will be utilized. If more air is being forced back into the heating or cooling chamber than is passing therefrom into the rooms of the house, the surplus will be forced out of the fresh-air duct into the external atmosphere.

A simple hand-switch may be provided for each motor to prevent its action when desired.

Advantage is taken of the fact that the air travels in both directions in the fresh-air pipe to provide the apparatus with means for automatically controlling the supply of heat or cold to the radiators in the heating or cooling chamber, so as to prevent waste of power. A swinging vane is introduced into the fresh-air pipe, and by its movements back and forth controls electric circuits, which include devices for controlling the supply of heat or cold to the radiators.

In the accompanying drawings, forming a part hereof, Figure 1 is a sectional elevation of part of a house showing my apparatus applied thereto; Fig. 2, a detail sectional view showing on a larger scale the location of a fan and motor at the end of an air-pipe; Fig. 3, a similar view illustrating the motor separated from the fan and placed above the mouth of the air-pipe. Figs. 4, 5, and 6 are views, principally in diagram, showing the connections of the thermostat, the motor, and the intermediate apparatus; and Fig. 7, a view, partly in diagram, illustrating the devices for controlling the supply of heat or cold to the heating or cooling chamber.

A is a heating or cooling chamber or box located in the cellar or basement of the building. It is shown as provided with radiators $a$, through which a heating medium—such as steam—or a cooling medium—such as water—may be passed; or this chamber A may be the air-chamber of a hot-air furnace. A fresh air pipe or duct, B, leads from the chamber A to a point outside the building. From the chamber A also leads the air pipes or ducts C D, leading to the rooms E F. At the open upper end of each room-pipe is placed a revolving fan, G, which is driven by an electric motor, H, capable of revolving in opposite directions.

The motor may carry the fan directly on its shaft and be located with the fan in the open end of the pipe, as shown in Figs. 1 and 2, or the motor may be, in a box above, below, or to one side of the air-pipe and be connected with the fan by an endless cord, as shown in Fig. 3.

I is the thermostat, and K is the intermediate apparatus, of which there is one of each for each motor. The intermediate apparatus in Fig. 1 is inclosed in the boxes upon which the thermostats are mounted, and in or upon which the electric connections between the thermostat and the intermediate apparatus are made. In Figs. 4 to 6 such intermediate apparatus is disclosed. It is composed of two electro-magnets, $b\,c$, between which is a pivoted armature-lever, $d$, held normally in a central position. The thermostat is located in a circuit, 3 4, from a suitable source of electrical energy. This is preferably the electric-lighting circuit 1 2, a resistance, R, being used to reduce the flow of current. At the contacts $e\,f$ of the thermostat the circuit 1 2 is divided into branches 5 and 6, the branch 5 including the magnet $b$, while the branch 6 includes the magnet $c$. In Figs. 4 and 5 the armature-lever $d$ plays between simple contacts $g\,h$. From the circuit 3 4, or directly from 1 2, is taken the motor-circuit 7 8. Conductor 7 extends to the motor-armature and from thence to the pivot of the lever $d$. At the contacts $g\,h$ this circuit is divided, the branches including oppositely-wound sections of the motor field-magnet, as in Fig. 4, or one branch including one leg of the field-magnet and the other branch the other leg, as in Fig. 5. The conductor 8 extends from the joined ends of the oppositely-wound field-magnet sections, Fig. 4, or from the field-wire when it passes from one leg to the other of the field-magnet, Fig. 5.

In Fig. 6 the field-magnet coils of the motor are shown at $i$ and the motor-armature at $k$. The lever $d$ is shown as working a two-arm reversing device, $l$, reversing the connections of the field-magnet coils, and also serving to make and break the entire motor-circuit. In all three instances of intermediate apparatus the motor-armature and field-magnet are located in series in the same circuit, so as to get the advantage of their combined resistance, and the motor is reversed by reversing the polarity of its field-magnet. The reversing apparatus also serves to open the motor-circuit. The peculiar intermediate apparatus shown in Figs. 4 and 5 possesses the advantage of only requiring the use of simple contact-points; but it has the disadvantage as compared with the apparatus of Fig. 6 of not bringing all the wires of the field-magnet into circuit at one time.

When a thermostat closes circuit at $e$ or $f$, the magnet $b$ or $c$ is brought into circuit, and closes the motor-circuit with such a polarity to the field-magnet that the motor will revolve in one or the other direction, according to whether the thermostat closes on $e$ or on $f$. The motor will revolve the fan, which will deliver heated or cooled air to the room or draw air from the room, the loss in the latter case being supplied through a ventilator, L, or through the openings around windows and doors. This operation will continue until the temperature is changed to the necessary extent, when the thermostat will break the circuit to the intermediate apparatus, and this, in turn, will break the motor-circuit. The air drawn from one room will be driven back into the heating or cooling chamber, and from thence distributed to other rooms or forced out of the fresh-air duct.

A simple hand-switch, $m$, Figs. 4, 5, and 6, is included in the thermostat-circuit 3 4, so that when desired the apparatus may be made inoperative by breaking the thermostat-circuit. To control the supply of heat or cold to the radiators $a$ in the chamber A and prevent waste of power, advantage is taken of the fact that when there is an excess in the supply of heat or cold to the radiators air will be forced out of the fresh-air pipe B, and under the opposite conditions air will be drawn in through said pipe. A swinging vane, M, is introduced into the fresh-air pipe B, Fig. 7. When this vane hangs vertically, it stands centrally between contact-points $n\,o$, and out of contact with such points. The pipe N supplies the heating or cooling medium to the radiators $a$, and is provided with a cock, $p$, which is opened and closed by a pitman-bar, $q$, extending to a wheel, $r$, which wheel is turned by a clock-train, represented by the weight $s$; or any other form of motor can be employed for this purpose. An arm, $t$, on the same shaft as the wheel $r$, is intercepted by the armature-levers $u\,v$ of two electro-magnets, O P, such armature-levers being located at diametrically-opposite points, so as to stop the wheel $r$ at each half-revolution.

From the electric-lighting circuit 1 2 is taken the circuit 9 10, which passes to the pivot of vane M and extends in two branches from the contact-screws $n\,o$ to the magnets O P, from thence to the armature-levers $u\,v$ of such magnets, and then by a common return from the shaft of wheel $r$ to the other side of the circuit 1 2. A resistance, R', may be included in the circuit 9 10, if desired. The cock $p$ is shown as open. When the vane M is swung by an outflowing current of air, it makes contact at o and closes circuit to the magnet P, which releases the wheel r, and this wheel turns until the arm t is intercepted by the lever u of the magnet O. This half-revolution of the wheel draws the pitman to the other side of the wheel and closes the cock, cutting off the supply of the heating or cooling medium to the radiators a. When the vane swings in the other direction, it will make contact at n and close circuit to the magnet O, when the wheel r will be again released, opening the cock p, and the parts will again assume the position shown. By extending the circuits of the magnets O P through their armature-levers the circuit to each magnet can be completed only when the revolving arm t is in contact with its armature-levers. Hence, each magnet has its circuit broken as soon as it releases the arm t, and a waste of current is prevented. The vane M can be made as sensitive as desired by constructing the part above the pivot of nearly the same weight as the part below the pivot, and by properly proportioning the relative weight of these parts the precise action desired can be secured; or a balanced revolving vane could be used, if desired.

What I claim is—

1. The combination, with an air pipe, duct, or flue delivering air to a room in a building, of a fan or blower located within said pipe, an electric motor operating the same, and a thermostat controlling such motor, substantially as set forth.

2. The combination, with an air pipe, duct, or flue delivering air to a room in a building, of a fan or blower located within said pipe, an electric motor operating the same, an intermediate electric apparatus directly controlling the motor-circuit, and a thermostat opening and closing circuit to such intermediate apparatus, substantially as set forth.

3. The combination, with an air pipe, duct, or flue delivering hot or cold air to a room, of a fan or blower located within such pipe and capable of reverse movements, so as to force air into or draw it from the room, and devices controlled by changes in temperature in the room and acting to work such fan or blower in opposite directions, substantially as set forth.

4. The combination, with two or more air pipes, ducts, or flues extending to different rooms of a building, and a common hot or cold air-chamber from which such pipes extend, of a fan or blower located within each of such pipes and capable of reverse movements, so as to force air into or draw it from the room, and devices for each fan controlled by changes in temperature and acting to work such fan or blower in opposite directions, substantially as set forth.

5. The combination, with an air pipe, duct, or flue delivering hot or cold air to a room, of a fan or blower within such pipe capable of movement in opposite directions, an electric motor driving such fan, an intermediate circuit controlling and reversing apparatus for such motor, and a thermostat controlling the circuit to such intermediate apparatus, substantially as set forth.

6. The combination, with the temperature-maintaining fan, of the electric motor driving the same, and having its armature and field-magnet coils in series, an intermediate electric apparatus acting to make and break the motor-circuit and to reverse the connections of its field-magnet coils, and the thermostat controlling the circuit of the intermediate apparatus, substantially as set forth.

7. The combination, with the temperature-maintaining fan, the electric motor, the intermediate apparatus, and the thermostat, of an electric lighting circuit, and connections therefrom to such devices, substantially as set forth.

8. The combination, with the temperature-maintaining fan, the electric motor, the intermediate apparatus, the thermostat, and electric connections for supplying such devices with current for automatic operation, of a hand-switch for rendering said devices inoperative, substantially as set forth.

9. The combination, with a heating or cooling chamber, air-pipes leading therefrom to the rooms of the building, and a fresh-air pipe leading to such chamber and having a vane moved by the air currents in such pipe, of means controlled by the air currents in such fresh-air pipe and acting to control the supply of the heating or cooling medium to such chamber, substantially as set forth.

10. The combination, with a heating or cooling chamber, air-pipes leading therefrom to the rooms of the building, thermostatically-controlled motors operating fans which act to force air into or draw it from the rooms, and a fresh-air pipe leading to such chamber and having a vane moved by the air-currents in such pipe, of means controlled by the air-currents in such fresh-air pipe and acting to control the supply of the heating or cooling medium to such chamber, substantially as set forth.

11. The combination, with the heating or cooling chamber and the fresh-air pipe, of the moving vane in such pipe, a valve controlling the supply of the heating or cooling medium to such chamber, and electric connections controlled by the vane for operating such valve, substantially as set forth.

12. The combination, with the fresh-air pipe, the vane therein, and the valve-operating wheel revolved by a motor, of the revolving stop-arm, and the two electro-magnets having their circuits extending through their armatures and said revolving stop-arm, whereby the circuit of each magnet will be opened after releasing such stop-arm, substantially as set forth.

This specification signed and witnessed this 6th day of October, 1886.

EDWD. H. JOHNSON.

Witnesses:
RICHD. N. DYER,
WM. PELZER.